(12) United States Patent
Pianigiani et al.

(10) Patent No.: US 12,265,808 B1
(45) Date of Patent: Apr. 1, 2025

(54) AUTOMATED APPLICATION SERVICE DEPLOYMENT ACROSS MULTIPLE ENVIRONMENTS

(71) Applicant: Juniper Networks, Inc., Sunnyvale, CA (US)

(72) Inventors: Jacopo Pianigiani, Cupertino, CA (US); Carlos Parada, Lisbon (PT); Ignacio Suarez Navas, Madrid (ES); Julio Carrasco Pinto, Albacete (ES); Luca Tosolini, Trezzano sul Naviglio (IT); Christian Thrun, Oberhausen (DE); Francis Xavier Antonio Santana, Cheltenham (GB)

(73) Assignee: Juniper Networks, Inc., Sunnyvale, CA (US)

( * ) Notice: Subject to any disclaimer, the term of this patent is extended or adjusted under 35 U.S.C. 154(b) by 21 days.

(21) Appl. No.: 17/661,995

(22) Filed: May 4, 2022

(51) Int. Cl.
  *G06F 8/60* (2018.01)
  *G06F 8/71* (2018.01)

(52) U.S. Cl.
  CPC . *G06F 8/60* (2013.01); *G06F 8/71* (2013.01)

(58) Field of Classification Search
  CPC .................................. G06F 8/60; G06F 8/71
  See application file for complete search history.

(56) References Cited

U.S. PATENT DOCUMENTS

| | | |
|---|---|---|
| 7,181,731 B2 | 2/2007 | Pace et al. |
| 7,735,078 B1 * | 6/2010 | Vaidya ................ G06F 9/44547 717/172 |
| 8,166,469 B2 * | 4/2012 | Milner ....................... G06F 8/65 709/225 |
| 8,458,690 B2 * | 6/2013 | Zhang ....................... G06F 8/65 717/171 |
| 9,009,662 B2 * | 4/2015 | Nelson ................ G06F 9/44505 717/111 |

(Continued)

OTHER PUBLICATIONS

"Artifact management overview," Google Cloud, Jan. 22, 2021, last updated Feb. 10, 2022, 1 p., Retrieved from the Internet: URL: https://cloud.google.com/artifact-management/docs/overview.

(Continued)

*Primary Examiner* — Douglas M Slachta
(74) *Attorney, Agent, or Firm* — Shumaker & Sieffert, P.A.

(57) ABSTRACT

In general, a device comprising a processor and a memory may be configured to perform various aspects of the techniques described in this disclosure. The memory may store source configuration data of a source environment descriptor associated with a source operating environment and target configuration data of a target environment descriptor associated with a target operating environment. The processor may compare the source configuration data to the target configuration data, and generate, based on the comparison, update data including software component versions. The processor may generate, based on the update data, a unified release including a new application release version, the new application release version including release propagation data. The processor may further propagate the unified release to the target operating environment, where the release propagation data may provide instructions for the target operating environment to update the target configuration data and deploy a new application service.

16 Claims, 5 Drawing Sheets

(56) References Cited

U.S. PATENT DOCUMENTS

| | | | | |
|---|---|---|---|---|
| 9,021,484 | B2* | 4/2015 | Branch | G06F 11/3428 |
| | | | | 718/100 |
| 9,182,978 | B2* | 11/2015 | Miller | G06F 9/44505 |
| 9,256,509 | B1* | 2/2016 | Rajagopal | G06F 11/008 |
| 9,280,338 | B1* | 3/2016 | Stickle | G06F 9/44536 |
| 9,760,366 | B2* | 9/2017 | Frank | G06F 16/958 |
| 9,792,003 | B1* | 10/2017 | Story, Jr. | G06F 16/9535 |
| 9,881,351 | B2* | 1/2018 | Spanton | G06F 9/4552 |
| 10,146,673 | B2* | 12/2018 | Koren | G06F 8/71 |
| 10,303,586 | B1* | 5/2019 | Falko | G06F 11/3636 |
| 10,691,439 | B2* | 6/2020 | Zhu | G06F 8/65 |
| 10,785,122 | B2* | 9/2020 | Inamdar | H04L 41/082 |
| 11,113,265 | B2* | 9/2021 | Hirose | G06F 11/0751 |
| 11,151,020 | B1* | 10/2021 | Bajoria | G06F 9/54 |
| 11,379,215 | B1* | 7/2022 | Jayakumar | H04L 9/3265 |
| 11,507,295 | B2* | 11/2022 | Myers | G06F 3/0647 |
| 11,972,241 | B2* | 4/2024 | Garaev | H04L 9/3247 |
| 2006/0130046 | A1 | 6/2006 | O'Neill | G06F 9/30003 |
| | | | | 717/168 |
| 2008/0010243 | A1* | 1/2008 | Weissman | G06F 16/24575 |
| 2011/0271275 | A1* | 11/2011 | Ochi | G06F 8/63 |
| | | | | 717/177 |
| 2013/0219376 | A1* | 8/2013 | Nelson | G06F 9/44505 |
| | | | | 717/138 |
| 2014/0149975 | A1* | 5/2014 | Doan | G06F 8/65 |
| | | | | 717/172 |
| 2015/0293952 | A1* | 10/2015 | Ogrinz | G06F 16/27 |
| | | | | 707/702 |
| 2015/0378716 | A1* | 12/2015 | Singh | H04L 67/10 |
| | | | | 717/172 |
| 2017/0124073 | A1 | 5/2017 | McKenzie et al. | |
| 2017/0207968 | A1 | 7/2017 | Eicken et al. | |
| 2018/0060065 | A1* | 3/2018 | Lai | G06F 8/71 |
| 2018/0336027 | A1* | 11/2018 | Narayanan | G06F 8/61 |
| 2019/0205112 | A1* | 7/2019 | Salameh | G06F 8/65 |
| 2020/0314145 | A1 | 10/2020 | Boligano et al. | |
| 2021/0044646 | A1 | 2/2021 | Guim Bernat et al. | |
| 2021/0132925 | A1 | 5/2021 | Bursell | |
| 2022/0206772 | A1 | 6/2022 | Akiona et al. | |
| 2022/0342649 | A1 | 10/2022 | Cao et al. | |
| 2023/0004549 | A1 | 1/2023 | Woolven et al. | |
| 2023/0229476 | A1 | 7/2023 | Oki et al. | |
| 2024/0020105 | A1* | 1/2024 | Palamadai | H04L 67/34 |

OTHER PUBLICATIONS

"Best Practices for Structuring and Naming Artifactory Repositories," JFrog, Mar. 9, 2021, 11 pp., Retrieved from the Internet: URL: https://jfrog.com/whitepaper/best-practices-structuring-naming-artifactory-repositories/.

Masarwa, "General: What is an artifact repository?," JFrog, May 5, 2021, 2 pp., Retrieved from the Internet: URL: https://jfrog.com/knowledge-base/what-is-an-artifact-repository/.

Sabella et al., "Edge Computing: from standard to actual infrastructure deployment and software development," Intel White Paper, Intel Corporation, Oct. 2019—(revised Aug. 2021), 44 pp.

U.S. Appl. No. 17/701,085, filed Mar. 22, 2022, naming inventors Thurn et al.

* cited by examiner

AUTOMATED APPLICATION SERVICE DEPLOYMENT ACROSS MULTIPLE ENVIRONMENTS

TECHNICAL FIELD

The invention relates to computing devices and, more particularly, to release propagation in software management systems.

BACKGROUND

Organizations such as software developers and software application service providers (e.g., network and telecom service providers, etc.) manage their application service deployment over disparate environments, such as a lab and production environment. It is common to upload software into a lab environment system, install it, and run validation activities prior to use. Uploading the same software package into a new environment system that may have different hardware and software configurations (e.g., production environment) often requires that changes be made manually in the new environment for proper operation and validation of the software package. This process is inefficient as it is time consuming and prone to user error resulting in wasted resources and system down time.

SUMMARY

In general, techniques are described for facilitating release propagation of application service operations across different operating environments. There are three layers that may be configured to operate predictably in the release propagation of application service operation deployments. This includes an infrastructure layer, an application layer, and a management and orchestration (MANO) layer. The infrastructure layer includes the physical and virtualized infrastructure, such as physical hardware architecture and virtual machines (VMs). The MANO layer provides automation of operations and management of each of the aforementioned layers.

Each of these layers (e.g., infrastructure, application, management and orchestration, etc.) refers to a combination of hardware and software packages, as well as configuration data which provides the inputs for each of these stacks to operate correctly when deployed in a specific operating environment. The software packages associated with each layer may also be referred to as a stack or software stack. Within those layers (e.g., infrastructure, application, management) there are dependencies between the software subcomponents of each stack, the configurations for each of these subcomponents, and corresponding software stacks and subcomponents that manage (e.g., automate and monitor) these stacks at the infrastructure or application level.

Thus, when a new application service operation is introduced into new operating environments (e.g., development into production, etc.) each operating environment may require one or more changes or updates to their respective layers. This may include updating configuration data associated with multiple software stacks such that the behavior and interactivity between each software stack achieves the desired functional behavior for the given input, for example, as provided by the new application service operation.

The techniques described in this disclosure may allow for automated deployment of application services into multiple operating environments using a unified release that includes abstracted configuration data for each operating environment in the release propagation path. The unified release may be propagated to each environment such that each environment may automatically update any configuration data required to execute the new application service. The configuration data may be stored in one or more repositories and includes specific versions of software subcomponents in addition to artifacts including descriptors, templates, and images that are consistent with specific software versions (e.g., VNF software) to operate or instantiate a service within that operating environment. The techniques may include generating a comparison between environment descriptors of each environment. An environmental descriptor is a snapshot of the configuration of each target operating environment (e.g., lab, canary or production) and the operating environment required to operate the application service. The comparison may be used to determine which configuration data (e.g., subcomponents, artifacts, etc.) are needed for each operating environment to operate or instantiate the service in that environment.

Rather than manually assemble and install each combination of configuration data for each operating environment to deploy an application service, a user may initiate a release propagation pipeline using a software development system in a source operating environment to generate a comparison to determine which configuration data is needed for each operating environment. The software development system may, based on the comparison, generate and distribute a unified release to a central repository for access by one or more operating environments. Once distributed, an update process (e.g., a continuous integration/continuous delivery—CICD—pipeline) is triggered that is associated with the unified release generated by the software development system.

As such, various aspects of the techniques described in this disclosure may improve release propagation of application service operations across multiple operating environments without manual intervention. The automated release propagation may improve operation of software development systems themselves by reducing the incidence of human error in the manual configuration and validation of such systems and therefore reduce system downtime and debugging resources for application service providers. Additionally, by reducing human error that may result in additional steps to correct such error, the various aspects of the techniques for automating release propagation described herein may reduce consumption of computing resources, for example, processor cycles, memory, memory bus bandwidth, etc., and associated power consumption.

In one aspect, various aspects of the techniques are directed to a method for deploying a new application service, the method comprising: comparing, by one or more processors, source configuration data of a source environment descriptor associated with a source operating environment to target configuration data of a target environment descriptor associated with a target operating environment; generating, by the one or more processors and based on the comparison, update data including a set of software component versions to update in the target configuration data; generating, by the one or more processors and based in part on the update data, a unified release including a new application release version, the new application release version including release propagation data for updating the target configuration data; and propagating, by the one or more processors, the unified release to the target operating environment, wherein the release propagation data of the unified release is configured to provide instructions for the target operating environment to update the target configuration data and deploy the new application service.

In another aspect, various aspects of the techniques are directed to a computing device comprising: a memory configured to store source configuration data of a source environment descriptor associated with a source operating environment and target configuration data of a target environment descriptor associated with a target operating environment; and one or more processors operably coupled to the memory and configured to: compare the source configuration data to the target configuration data; generate, based on the comparison, update data including a set of software component versions to update in the target configuration data; generate, based in part on the update data, a unified release including a new application release version, the new application release version including release propagation data for updating the target configuration data; and propagate the unified release to the target operating environment, wherein the release propagation data of the unified release is configured to provide instructions for the target operating environment to update the target configuration data and deploy a new application service.

In another aspect, various aspects of the techniques are directed to a non-transitory computer-readable medium having stored thereon instructions that, when executed, cause one or more processors to: compare source configuration data of a source environment descriptor associated with a source operating environment to target configuration data of a target environment descriptor associated with a target operating environment; generate, based on the comparison, update data including a set of software component versions to update in the target configuration data; generate, based in part on the update data, a unified release including a new application release version, the new application release version including release propagation data for updating the target configuration data; and propagate the unified release to the target operating environment, wherein the release propagation data of the unified release is configured to provide instructions for the target operating environment to update the target configuration data and deploy the new application service.

The details of one or more aspects of the techniques are set forth in the accompanying drawings and the description below. Other features, objects, and advantages of the techniques will be apparent from the description and drawings, and from the claims.

DETAILED DESCRIPTION

In general, techniques are described for facilitating release propagation of application service operations across various target operating environments. Release propagation refers to deploying new application service operations to different target environments from a testing environment to a deployment environment. Each target operating environment includes a pipeline for deploying software service applications, such as a continuous integration continuous delivery (CICD) pipeline for application service operations. Each CICD pipeline may include a software stack of software subcomponent versions for application service operations within their respective target environment. Each stack may include other stacks and their subcomponents associated with operation layers specific to the environment, such as infrastructure, application, management, etc.

A target operating environment may include a test environment, a canary environment or a production environment. The production environment may include a live (e.g., deployed to user devices) production environment or a live canary environment, which may be a live subset of the production environment. Each environment may have multiple hardware, firmware and software configurations. The configuration of a particular environment (e.g., lab) may require a unique CICD pipeline or application release version that includes subcomponents and tools to manage a particular application service life cycle in a particular environment. This may require manually configuring (e.g., a user updating each CICD release pipeline) each environment by a human, thus introducing configuration errors and service downtime caused by human error among other problems such as iterative debugging and validating.

As used herein, "configuration data" may include one of or combinations of subcomponents, artifacts, descriptors, templates, and images associated with one or more software versions, where software versions include individual software elements or stacks of software elements configured to act in unison to enable application service operations.

Figure 1:
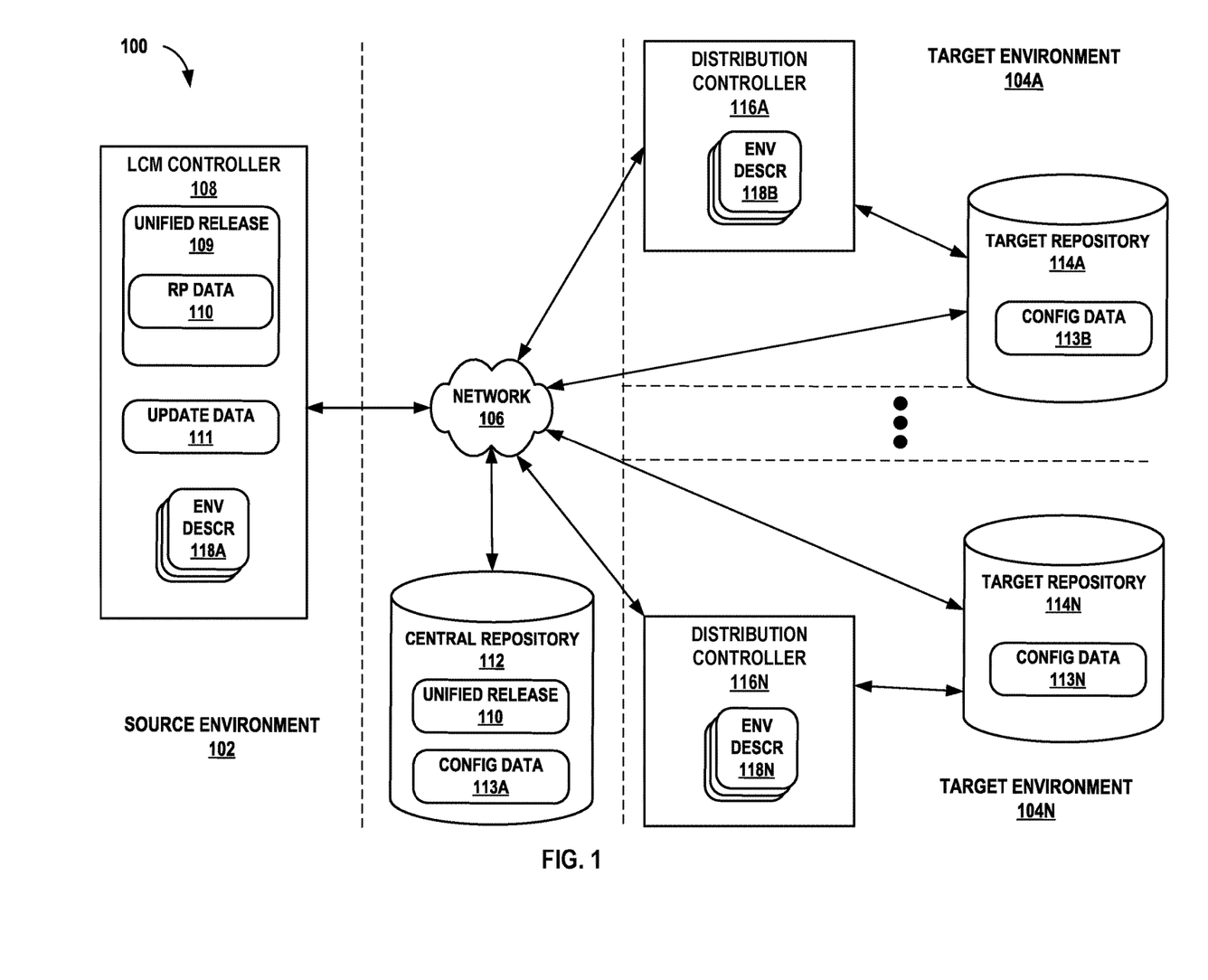
FIG. 1 is a block diagram of an example release management system configured to perform various aspects of automated release propagation management to multiple environments according to techniques described in this disclosure.

FIG. 1 is a block diagram of an example release management system 100 configured to perform various aspects of automated release propagation management to multiple environments according to techniques described in this disclosure. As shown in the example of FIG. 1, software release management system 100 manages release propagation of a unified release 109 from a source operating environment 102 to a number of different operating environments by triggering a software release pipeline (e.g., CICD pipeline). Software release pipeline may include a software stack of software subcomponent versions for application service operations within respective target operating environments 104A-104N. For example, a software release pipeline associated with target operating environments 104A-104N. The propagate unified release 109 may include abstracted configuration data for each operating environment in the release propagation path. The unified release may be propagated to each environment through repositories such that each environment may automatically update any configuration data required to execute the new application service.

In one example, source operating environment 102 includes life cycle management controller 108 ("LCM controller 108") in communication with target operating environments 104A-N and central repository 112 through network 106. Network 106 may be a private network (e.g., secure LAN, VLAN, etc.), a public network (e.g., the Internet), or combination of the two. For example, a central repository 112 may be accessed over the public network portion of network 106 while target operating environments 104A-104N may be accessed by a private network portion of network 106. Thus, in this example, target operating environments 104A-104N may represent environments that are protected from direct access via a public network. The target operating environments 104A-104N may be secured by way of one or more firewalls, intrusion detection prevention (IDP) devices, network address translation (NAT) devices, and/or other network security devices that attempt to prevent direct access from the public portion of network 106 unless in some instances such access is authenticated.

Each target operating environment 104 may include a distribution controller and an environment descriptor (e.g., distribution controllers 116B-116N and environment descriptors 118B-118N). Distribution controllers 116 may each represent a web-based service that operates according to a representational state transfer (REST or, sometimes denoted, RESTful) application programming interface (API) (REST API) that integrates with various systems, including in some instances the CICD infrastructure. Although described as a distributed web-service, distribution controllers 116 may also represent dedicated networking devices and/or services running on dedicated servers or other types of network devices capable of performing the operations of distribution controllers 116 described throughout this disclosure.

Environment descriptors 118B-118N in addition to environment descriptor 118A of source operating environment 102 may represent files that describe the state or configuration of each operating environment in terms of configuration data and their associated versions. In other instances, a single environment descriptor of environment descriptors 118 may define the state of multiple operating environments 104 and may be stored in central repository 112, source operating environment 102, or other location accessible by source operating environment 102 and target operating environments 104. Environmental descriptors 118 may be language independent (meaning that JSON or other data-interchange formats are not specific to any underlying programming language such as JavaScript, C, C++, C#, Java, Perl, Python, etc.). Environmental descriptors 118 may conform to the JavaScript Object Notation (JSON) format or any other lightweight data-interchange format utilized by webservices, such as distribution controllers 116.

Configuration data (e.g., configuration data 113B) may be based on the combination of layers (e.g., infrastructure, application, management) of hardware and software packages for each environment. As discussed above, the configuration data refers to subcomponent versions that may be stored on a central repository or a subset thereof on a local repository accessible by the target environment. Thus, each target operating environment 104A-N may include a local repository, such as target repositories 114A-114N that includes configuration data 113B-113N (collectively "configuration data 113"). Target repositories 114A-114N (collectively "target repositories 114") may also include unified release 109 generated and propagated, for example, from source operating environment 102 through central repository 112 for deployment of application services in one or more target operating environments 104.

Configuration data 113 may include all of the subcomponent versions required for each target operating environment to deploy different application services and application service versions referred to in unified release 109. For example, target repository 114A may include configuration data 113B of all of the subcomponents, individually or inclusive in one or more software stacks, required to deploy on target operating environment 104A each application service that may be referred to in the unified release 109. In one example, each of configuration data 113B-113N is a subset of configuration data 113A stored in central repository 112. Thus, central repository 112 may store a "master" set of configuration data that may include some or all of configuration data 113A-113N for one or more subcomponents, artifacts alone or within one or more software stacks. Software subcomponents and software artifacts of config data 113 may refer to any files created by a software development processes, such as packages, containers, configuration files, and/or documents along with any dependencies that may be required to build and/or deploy a release (e.g., unified release 109) to a particular environment, such as target operating environment 104A. For example, unified release 109 is propagated to central repository 112 for access by a target operating environment to deploy a new application service. Unified release 109 identifies additional configuration data for the target operating environment (e.g., target operating environment 104A) to deploy the new application service. In one example, in response to a trigger associated with the unified release 109, a distribution controller (e.g., distribution controller 116A) of the target operating environment may update its configuration data (e.g., configuration data 113B) by accessing configuration data 113A from central repository 112 based on release propagation data 110 ("RP data 110") associated with unified release 109.

For simplicity, central repository 112 is illustrated as a single repository, however, central repository 112 may include a multitude of repositories distributed across one or more data centers or in a cloud computing environment. For example, unified release 109 may be in one repository while configuration data 113A may be in one or more other repositories. Central repository 112 may represent any type of computer-readable media, including databases supported by non-volatile memory such as storage drives (e.g., hard drives, disc drives, tape drives, etc.), flash memory and the like, volatile memory (e.g., random access memory-RAM, synchronous RAM-SRAM, dynamic RAM-DRAM), or any other type of storage system having a hierarchical or non-hierarchical configuration capable of storing configuration data 113. Target repositories 114 may each be similar to, if not the same as, central repository 112 in terms of representing any type of computer-readable media.

In the example of FIG. 1, source operating environment 102 may be a development environment for building and testing new software, such as a new application service. Source operating environment 102 may be configured for deploying the new application service to a target environment, such as target operating environment 104A. In order for the new application service to operate correctly and be deployed at the target operating environment 104A, the target operating environment 104A may need to have updated configuration data such that it matches the configuration data of the source operating environment 102. To check whether the configuration data matches, LCM controller 108 may compare source configuration data (e.g., artifacts and software (sub) component versions) from environment descriptor 118A to target configuration data from environment descriptor 118B of target operating environment 104A.

Based on the differences found in the comparison, the LCM controller 108 may generate update data 111 that includes a set of software subcomponent versions to update in the target configuration data of target operating environment 104A. LCM controller 108 may, based on the update data 111, generate the unified release 109 that includes a new application service release version. The new application service release version includes release propagation data 110 that may be used by target operating environment 104A to deploy the new application service. The update data 111 may refer to portions of a file that indicates a difference in versions of the various configuration data, which may include entire stacks of subcomponents or individual subcomponents of one or more stacks, artifact versions, etc. This file may have columns of readable text that include indications of which of the subcomponents of configuration data need to be updated in the target operating environment to deploy the new application service.

In one example, the LCM controller propagates the unified release 109, including RP data 110, to central repository 112. The unified release 109 may include instructions to distribution controllers 116 to update configuration data 113B and deploy the new application service. To update configuration data 113B some or all of configuration data 113A stored in central repository 112 may be propagated to one or more target repositories 114 associated with the target operating environment 104 (e.g., at an edge node of a data center).

Each propagation may be triggered by an event, such as a change commit to one or more (e.g., config files) of the release propagation data 110, where a change commit includes an operation (e.g., by LCM controller 108) to send the latest changes of the source code to one or more repositories (e.g., central repository 112 and target repositories 114). Once triggered, distribution controllers 116 of each target operating environment 104 may update their respective configuration data 113 to deploy the new application service defined in unified release 109. In one example, to update target operating environment 104A, distribution controller 116A may generate one or more distribution operations to cause central repository 112 to provide some or all of update data 111 (e.g., software subcomponents, artifacts, etc.) to target repository 114A in target operating environment 104A. Because environmental descriptors 118 may be declarative and intent-based, distribution controller 116A may perform declarative checks and intent-based checks to reduce or eliminate human error from improper distribution of configuration data.

In other examples, the unified release 109 may also include other release propagation data similar to release propagation data 110 for some or all prior application service releases and/or other new application service release versions. The other release propagation may also be configured to propagate application services to other target environments that, for example, have different software and hardware configurations. Thus, instead of manually installing, validating and testing each of the required stacks and software subcomponents for each layer (e.g., infrastructure, application, management), a unified release may automate and improve release propagation of application service operations across multiple operating environments without manual intervention. The automated release propagation may also improve efficiency of application service provider operations (e.g., telecom data center) by reducing the incidence of human error in the manual configuration and validation. This reduces system downtime and the need for debugging resources for application service providers.

Figure 2:
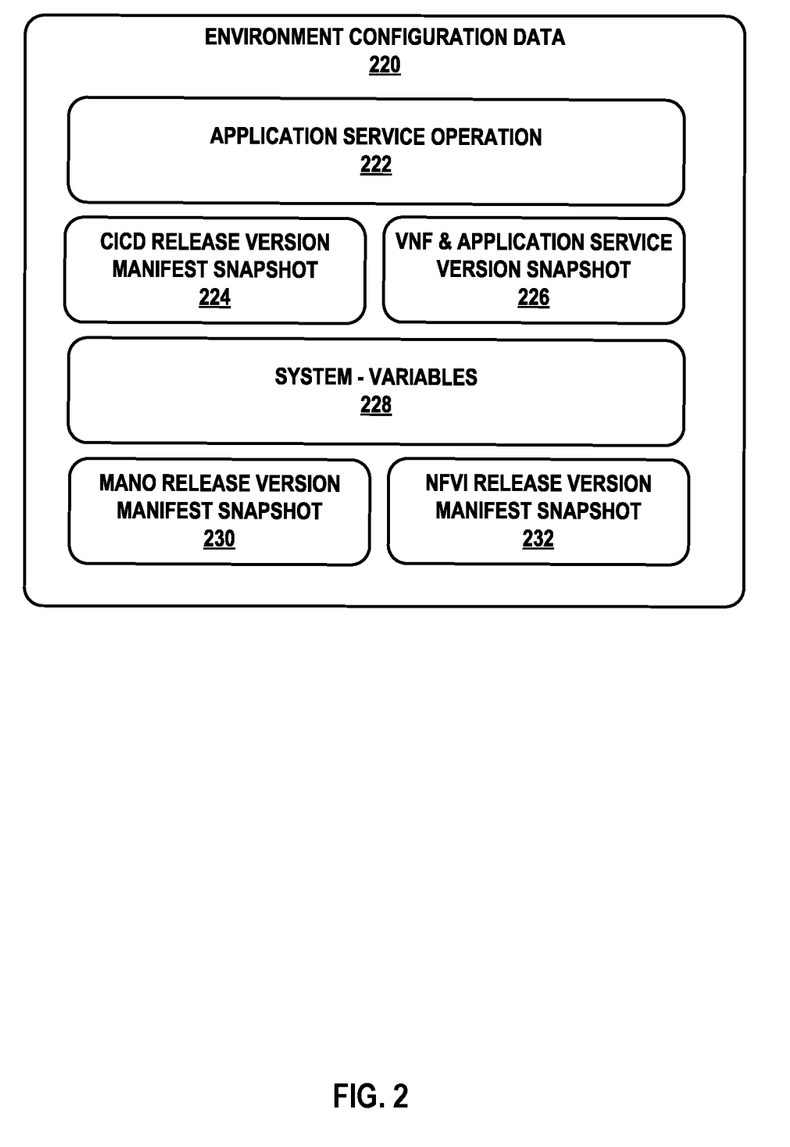
FIG. 2 is a block diagram of an example snapshot of components based on an environment descriptor of an operating environment according to techniques described in this disclosure.

FIG. 2 is a block diagram of an example snapshot of components based on an environment descriptor (e.g., environment descriptor 118A-118N) of an operating environment according to techniques described in this disclosure. The example of FIG. 2 is described with reference to environment descriptors of FIG. 1 and what elements of each may be compared between source operating environment and a target operating environment according to techniques described in this disclosure.

In this example, environment configuration data 220 includes an infrastructure layer, an application layer, and a management and orchestration (MANO) layer. Each layer may be represented by configuration data that includes various subcomponents and software stacks, which when combined is a complete software platform to support a specific application version. The infrastructure layer is represented by VNF (virtual network function) service version snapshot 226, system variables 228, and NFVI (network functions virtualization infrastructure). The application layer is represented by application service operation 222 and the MANO layer is represented by CICD version snapshot 224 and MANO version snapshot 230.

In one example, LCM controller 108 compares a snapshot of environment configuration data 220 of target operating environment 104A to a similar snapshot of environment configuration data of source operating environment 102. As illustrated in FIG. 1, LCM controller 108 may generate update data 111 based on the comparison and further, based on the update data 111, generate unified release 109. Unified release 109 includes a new application service release version of release propagation data 110 configured for deployment by distribution controller 116A of the new application service in the target operating environment 104A. In one example, release propagation data 110, in addition to including the update data, also includes existing configuration data that is not updated.

Figure 3:
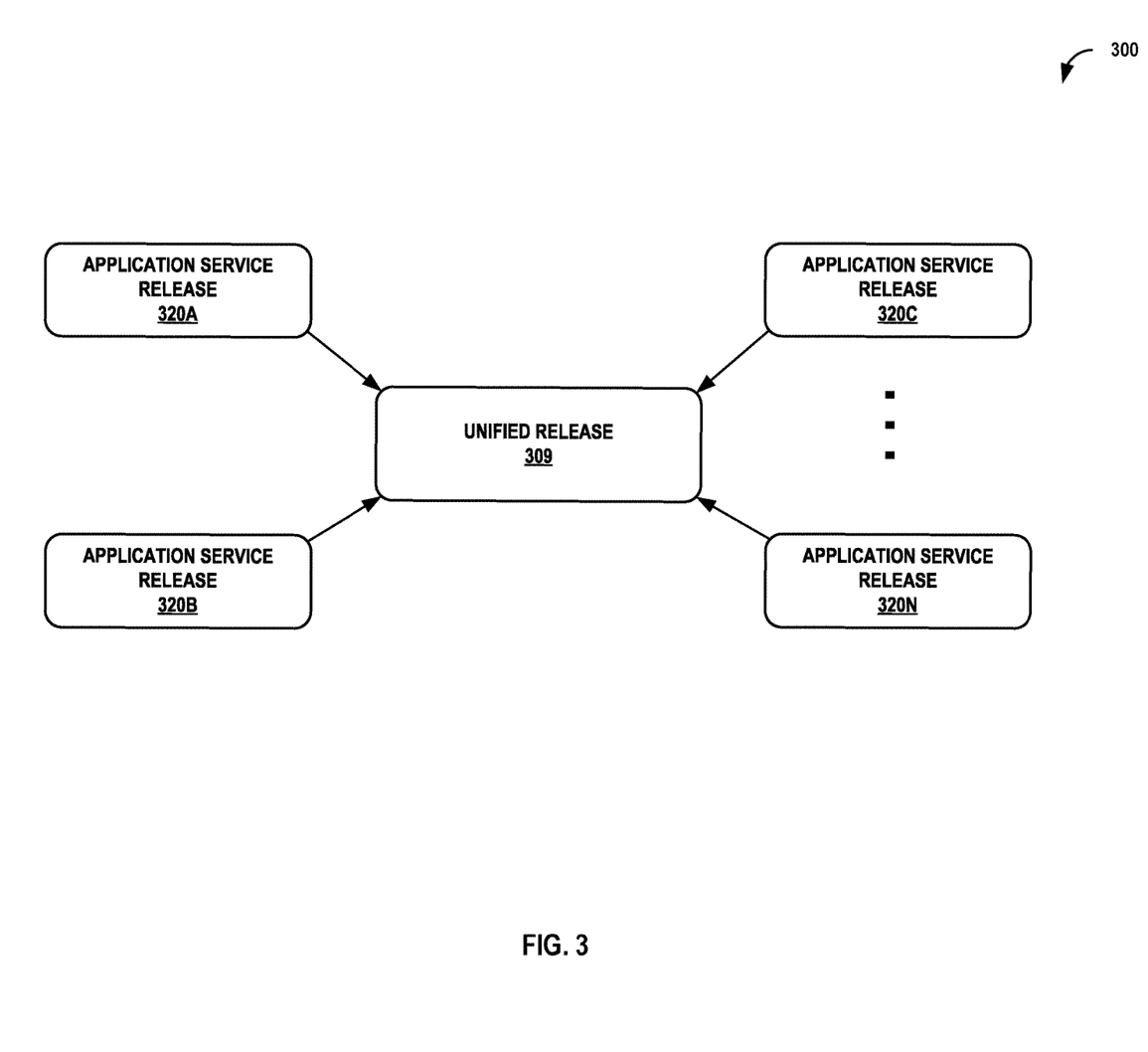
FIG. 3 is a block diagram of an example of a unified release that includes a plurality of application service releases according to techniques described in this disclosure.

FIG. 3 is a block diagram of an example of a unified release 309 that includes a plurality of application service releases according to techniques described in this disclosure. As illustrated in this example, unified release 309 includes release propagation data (e.g., release propagation data 110) for each application service release 320A-N. Each application service release 320A-N represents a unique set of environment configuration data (e.g., environment configuration data 220) as defined by corresponding release propagation data of unified release 309. For example, application service release 320A and application service release 320B may be existing application services, and application service release 320N may be a new application service release developed by source operating environment 102. For example, application service release 320A may represent configuration data required for target operating environment 104A, application service release 320B may represent configuration data required for target operating environment 104B, and application service release 320N may represent configuration data required for target operating environment 104N. Thus, unified release 109 may provide each target operating environment with the necessary release propagation data 110 to retrieve configuration data (e.g., artifacts, stacks, subcomponents, etc. from repositories) to deploy a respective application service to target operating environments, according to techniques described in this disclosure.

Figure 4:
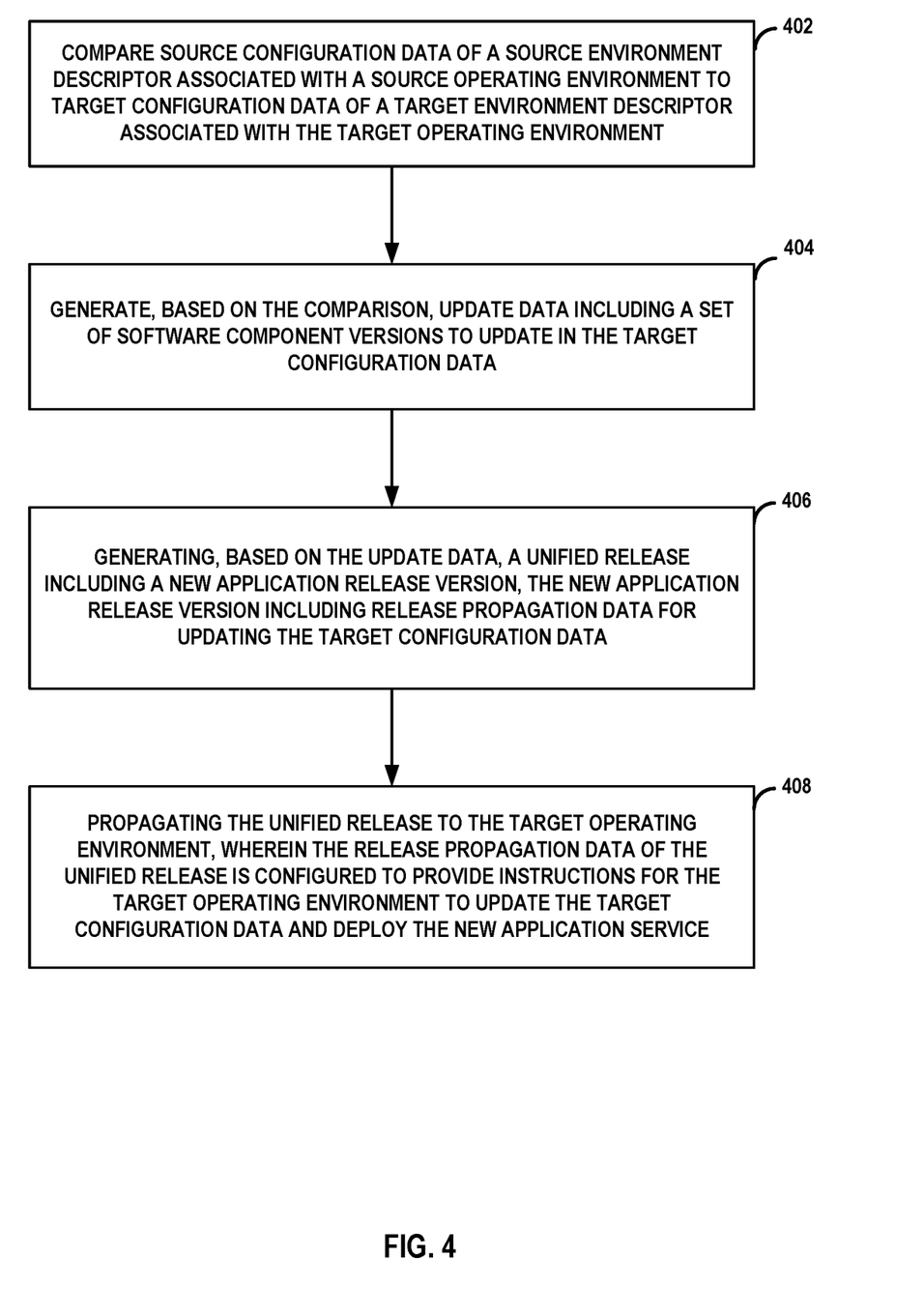
FIG. 4 is a flowchart illustrating example operation of the life cycle management (LCM) controller of FIGS. 1 and 2 for performing various aspects of automated release propagation management to multiple environments according to techniques described in this disclosure.

FIG. 4 is a flowchart illustrating example operation of the life cycle management (LCM) controller of FIGS. 1 and 2 for performing various aspects of automated release propagation management to multiple environments according to techniques described in this disclosure. LCM controller 108 may compare source configuration data of environment descriptor 118A associated with source operating environment 102 to target configuration data of environment descriptor 118B associated with the target operating environment 104A (402). LCM controller 108 may next generate, based on the comparison, update data 111 including a set of software component versions to update in the target configuration data (404).

LCM controller 108 may then generating, based on the update data 111, a unified release 109 including a new application release version, the new application release version including release propagation data 110 for updating the target configuration data (406). For example, configuration data 113B of target operating environment 104A. LCM controller 108 may propagate the unified release 109 to the target operating environment 104A, wherein the release propagation data 110 of the unified release 109 is configured to provide instructions for the target operating environment 104 to update the configuration data 113B and deploy the new application service (408). In other examples, unified release 109 may provide each target operating environment 104A-N with the necessary release propagation data 110 and instructions to retrieve required configuration data (e.g., artifacts, stacks, subcomponents, etc.) from one or more repositories (e.g., central repository 112) to deploy a respective application service to one or more operating environments, as according to techniques described in this disclosure.

Figure 5:
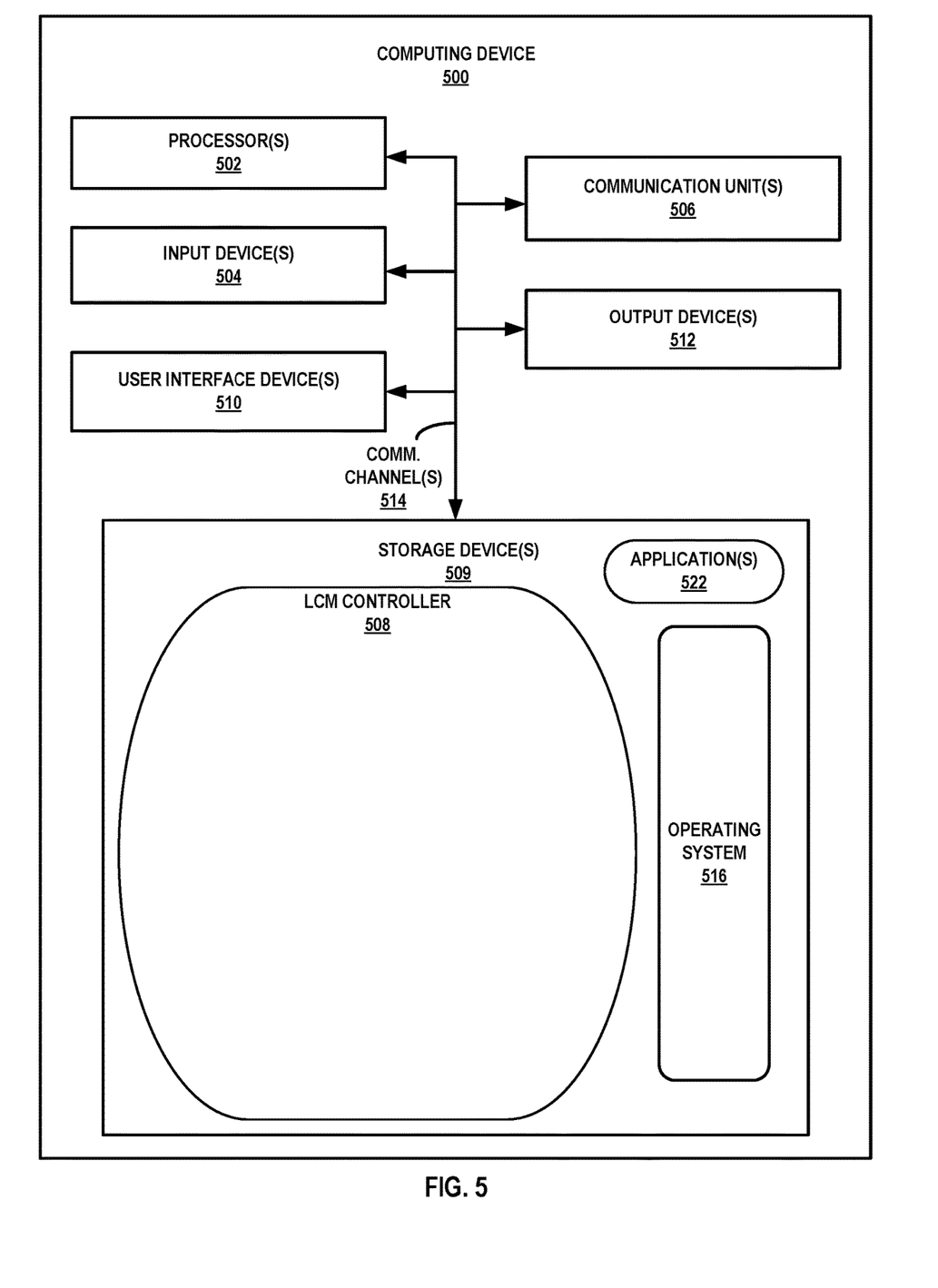
FIG. 5 is a block diagram illustrating further details of one example of a computing device that may be configured to perform various aspects of automated release propagation management to multiple environments according to techniques described in this disclosure.

FIG. 5 is a block diagram illustrating further details of one example of a computing device that may be configured to perform various aspects of automated release propagation management to multiple environments according to techniques described in this disclosure. FIG. 5 illustrates a particular example of a server or other computing device 500 that includes one or more processor(s) 502 for executing any one or more of LCM controller 508 (which may represent one example of LCM controllers 108/208 discussed above with respect to examples FIGS. 1-2), or any other component described herein. Other examples of computing device 500 may be used in other instances. Although shown in FIG. 5 as a stand-alone computing device 500 for purposes of example, a computing device may be any component or system that includes one or more processors or other suitable computing environment for executing software instructions and, for example, need not necessarily include one or more elements shown in FIG. 5 (e.g., communication units 506; and in some examples components such as storage device(s) 509 may not be co-located or in the same chassis as other components).

As shown in the example of FIG. 5, computing device 500 includes one or more processors 502, one or more input devices 504, one or more communication units 506, one or more output devices 512, one or more storage devices 509, and user interface (UI) device(s) 510. Computing device 500, in one example, further includes one or more application(s) 522, driver 12, and operating system 516 that are executable by computing device 500. Each of components 502, 504, 506, 509, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 509, 510, and 512 may be coupled by one or more communication channels 514.

Processors 502, in one example, are configured to implement functionality and/or process instructions for execution within computing device 500. For example, processors 502 may be capable of processing instructions stored in storage device 509. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 509 may be configured to store information within computing device 500 during operation. Storage device 509, in some examples, is described as a computer-readable storage medium. In some examples, storage device 509 is a temporary memory, meaning that a primary purpose of storage device 509 is not long-term storage. Storage device 509, in some examples, is described as a volatile memory, meaning that storage device 509 does not maintain stored contents when the computer is turned off. Examples of volatile memories include random access memories (RAM), dynamic random access memories (DRAM), static random access memories (SRAM), and other forms of volatile memories known in the art. In some examples, storage device 509 is used to store program instructions for execution by processors 502. Storage device 509, in one example, is used by software or applications running on computing device 500 to temporarily store information during program execution.

Storage devices 509, in some examples, also include one or more computer-readable storage media. Storage devices 509 may be configured to store larger amounts of information than volatile memory. Storage devices 509 may further be configured for long-term storage of information. In some examples, storage devices 509 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and LCM controller 508 with processors 502, communication unit 506, storage device 509, input device 504, user interface devices 510, and output device 512. Application 522 and LCM controller 508 may also include program instructions and/or data that are executable by computing device 500 to perform various aspects of the techniques described above in more detail.

In addition to or as an alternative to the above, the following examples are described. The features described in any of the following examples may be utilized with any of the other examples described herein.

Example 1. A method for deploying a new application service, the method comprising: comparing, by one or more processors, source configuration data of a source environment descriptor associated with a source operating environment to target configuration data of a target environment descriptor associated with a target operating environment; generating, by the one or more processors and based on the comparison, update data including a set of software component versions to update in the target configuration data; generating, by the one or more processors and based in part on the update data, a unified release including a new application release version, the new application release version including release propagation data for updating the target configuration data; and propagating, by the one or more processors, the unified release to the target operating environment, wherein the release propagation data of the unified release is configured to provide instructions for the target operating environment to update the target configuration data and deploy the new application service.

Example 2. The method of example 1, wherein propagating the unified release to the target operating environment further comprises propagating the unified release to a central repository accessible by a plurality of operating environments including the target operating environment.

Example 3. The method of any combination of examples 1 and 2, wherein generating the unified release further comprises generating additional sets of release propagation data, wherein each additional set of release propagation data includes corresponding updated target configuration data for deploying a corresponding additional application service in the target operating environment.

Example 4. The method of example 3, wherein one or more of the additional sets of release propagation data are configured to deploy one or more of the corresponding additional application service release versions in a second target operating environment.

Example 5. The method of example 3, wherein to generate the additional sets of release propagation data, the method further comprising: comparing a second target environment descriptor including a second set of configuration data for the second target operating environment to the source configuration data of the source operating environment, and generating additional update data including a set of software component versions of the second set of configuration data to update in the second target operating environment.

Example 6. The method of example 5, wherein one or more of the additional sets of release propagation data is configured to deploy the new application service release version in a corresponding one or more other target operating environments.

Example 7. The method of any combination of examples 1-6, the method further comprising initiating the propagating of the unified release to the target operating environment based in part on a change commit to a rollout file associated with the release propagation data.

Example 8. The method of any combination of examples 1-7, wherein the set of software component versions comprises subcomponent version snapshots of continuous integration continuous delivery (CICD) software, management and orchestration (MANO) software, virtual network function (VNF) software, and a network virtual function infrastructure.

Example 9. The method of any combination of examples 1-8, wherein the source operating environment is a software development system, and the target operating environment is one of a canary testing system or a production system.

Example 10. The method of any combination of examples 1-9, wherein the set of software component versions includes artifacts, descriptors, templates, or images associated with software versions listed in the source environment descriptor and the target environment descriptor.

Example 11. A computing device comprising: a memory configured to store source configuration data of a source environment descriptor associated with a source operating environment and target configuration data of a target environment descriptor associated with a target operating environment; and one or more processors operably coupled to the memory and configured to: compare the source configuration data to the target configuration data; generate, based on the comparison, update data including a set of software component versions to update in the target configuration data; generate, based in part on the update data, a unified release including a new application release version, the new application release version including release propagation data for updating the target configuration data; and propagate the unified release to the target operating environment, wherein the release propagation data of the unified release is configured to provide instructions for the target operating environment to update the target configuration data and deploy a new application service.

Example 12. The computing device of example 11, wherein the one or more processors are, when configured to propagate the unified release to the target operating environment, configured to propagate the unified release to a central repository accessible by a plurality of operating environments including the target operating environment.

Example 13. The computing device of any combination of examples 11 and 12, wherein the one or more processors are, when configured to generate the unified release, configured to generate additional sets of release propagation data, wherein each additional set of release propagation data includes corresponding updated target configuration data for deploying a corresponding additional application service in the target operating environment.

Example 14. The computing device of example 13, wherein one or more of the additional sets of release propagation data are configured to deploy one or more of the corresponding additional application service release versions in a second target operating environment.

Example 15. The computing device of example 13, wherein the one or more processors are, when configured to generate the additional sets of release propagation data, configured to: compare a second target environment descriptor including a second set of configuration data for the second target operating environment to the source configuration data of the source operating environment, and generate additional update data including a set of software component versions of the second set of configuration data to update in the second target operating environment.

Example 16. The computing device of example 15, wherein one or more of the additional sets of release propagation data is configured to deploy the new application service release version in a corresponding one or more other target operating environments.

Example 17. The computing device of any combination of examples 11-16, the one or more processors are further configured to initiate the propagating of the unified release to the target operating environment based in part on a change commit to a rollout file associated with the release propagation data.

Example 18. The computing device of any combination of examples 11-17, wherein the set of software component versions comprises subcomponent version snapshots of continuous integration continuous delivery (CICD) software, management and orchestration (MANO) software, virtual network function (VNF) software, and a network virtual function infrastructure.

Example 19. The computing device of any combination of examples 11-18, wherein the source operating environment is a software development system, and the target operating environment is one of a canary testing system or a production system.

Example 20. A non-transitory computer-readable medium having stored thereon instructions that, when executed, cause one or more processors to: compare source configuration data of a source environment descriptor associated with a source operating environment to target configuration data of a target environment descriptor associated with a target operating environment; generate, based on the comparison, update data including a set of software component versions to update in the target configuration data; generate, based in part on the update data, a unified release including a new application release version, the new application release version including release propagation data for updating the target configuration data; and propagate the unified release to the target operating environment, wherein the release propagation data of the unified release is configured to provide instructions for the target operating environment to update the target configuration data and deploy the new application service.

In this respect, the techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals or carrier waves, although the term "computer-readable media" may include transient media such as signals, in addition to physical storage media.

What is claimed is:

1. A method for deploying a new application service, the method comprising:
   comparing, by one or more processors, source configuration data of a source environment descriptor associated with a source operating environment to target configuration data of a target environment descriptor associated with a first target operating environment;
   generating, by the one or more processors and based on the comparison, update data including a set of software component versions to update in the target configuration data; generating, by the one or more processors and based in part on the update data, a unified release including a new application release version, the new application release version including release propagation data for updating the target configuration data and additional sets of release propagation data, wherein each additional set of release propagation data includes corresponding updated target configuration data for deploying a corresponding additional application service release versions in the first target operating environment, wherein generating the additional sets of release propagation data comprises:
      comparing a second target environment descriptor, including a second set of configuration data for a second target operating environment included in a plurality of operating environments, to the source configuration data of the source operating environment, and
      generating additional update data including a set of software component versions of the second set of configuration data to update in the second target operating environment; and
   propagating, by the one or more processors, the unified release to the first target operating environment, wherein the release propagation data of the unified release is configured to provide instructions for the first target operating environment to update the target configuration data and deploy the new application service, wherein the first target operating environment is one of the plurality of operating environments in a release propagation path that differ from at least one of the other of the plurality of operating environments, wherein the unified release includes abstracted configuration data for each of the plurality of operating environments in the release propagation path.

2. The method of claim 1, wherein propagating the unified release to the first target operating environment further comprises propagating the unified release to a central repository accessible by the plurality of operating environments including the first target operating environment.

3. The method of claim 1, wherein one or more of the additional sets of release propagation data are configured to deploy one or more of the corresponding additional application service release versions in the second target operating environment.

4. The method of claim 1, wherein one or more of the additional sets of release propagation data are configured to deploy the new application release version in a corresponding one or more other target operating environments included in the plurality of operating environments.

5. The method of claim 1, the method further comprising: initiating the propagating of the unified release to the first target operating environment based in part on a change commit to a rollout file associated with the release propagation data.

6. The method of claim 1, wherein the set of software component versions comprises subcomponent version snapshots of continuous integration continuous delivery (CICD) software, management and orchestration (MANO) software, virtual network function (VNF) software, and a network virtual function infrastructure.

7. The method of claim 1, wherein the source operating environment is a software development system, and the first target operating environment is one of a canary testing system or a production system.

8. The method of claim 1, wherein the set of software component versions includes artifacts, descriptors, templates, or images associated with software versions listed in the source environment descriptor and the target environment descriptor.

9. A computing device comprising:
   a memory configured to store source configuration data of a source environment descriptor associated with a source operating environment and target configuration data of a target environment descriptor associated with a first target operating environment; and
   one or more processors operably coupled to the memory and configured to:
      compare the source configuration data to the target configuration data;
      generate, based on the comparison, update data including a set of software component versions to update in the target configuration data;
      generate, based in part on the update data, a unified release including a new application release version, the new application release version including release propagation data for updating the target configuration data and additional sets of release propagation data, wherein each additional set of release propagation data includes corresponding updated target configuration data for deploying a corresponding additional application service release version in the first target operating environment, wherein the one or more processors are, when generating the additional sets of release propagation data, configured to:
         compare a second target environment descriptor including a second set of configuration data for a second target operating environment included in a plurality of operating environments, to the source configuration data of the source operating environment, and
         generate additional update data including a set of software component versions of the second set of configuration data to update in the second target operating environment; and
      propagate the unified release to the first target operating environment, wherein the release propagation data of the unified release is configured to provide instructions for the first target operating environment to update the target configuration data and deploy a new application service, wherein the first target operating environment is one of the plurality of operating environments in a release propagation path that differ from at least one of the other of the plurality of operating environments, wherein the unified release includes abstracted configuration data for each of the plurality of operating environments in the release propagation path.

10. The computing device of claim 9, wherein the one or more processors are, when configured to propagate the unified release to the first target operating environment, configured to propagate the unified release to a central repository accessible by the plurality of operating environments including the first target operating environment.

11. The computing device of claim 9, wherein one or more of the additional sets of release propagation data are configured to deploy one or more of the corresponding additional application service release versions in the second target operating environment.

12. The computing device of claim 9, wherein one or more of the additional sets of release propagation data is configured to deploy the new application release version in a corresponding one or more other target operating environments included in the plurality of operating environments.

13. The computing device of claim 9, the one or more processors are further configured to initiate the propagating of the unified release to the first target operating environment based in part on a change commit to a rollout file associated with the release propagation data.

14. The computing device of claim 9, wherein the set of software component versions comprises subcomponent version snapshots of continuous integration continuous delivery (CICD) software, management and orchestration (MANO) software, virtual network function (VNF) software, and a network virtual function infrastructure.

15. The computing device of claim 9, wherein the source operating environment is a software development system, and the first target operating environment is one of a canary testing system or a production system.

16. A non-transitory computer-readable medium having stored thereon instructions that, when executed, cause one or more processors to:
   compare source configuration data of a source environment descriptor associated with a source operating environment to target configuration data of a first target environment descriptor associated with a target operating environment;
   generate, based on the comparison, update data including a set of software component versions to update in the target configuration data; generate, based in part on the update data, a unified release including a new application release version, the new application release version including release propagation data for updating the target configuration data and additional sets of release propagation data, wherein each additional set of release propagation data includes corresponding updated target configuration data for deploying a corresponding additional application service release version in the first target operating environment, wherein the instructions include instructions for generating the additional sets of release propagation data that, when executed cause the one or more processors to:
  compare a second target environment descriptor including a second set of configuration data for a second target operating environment included in a plurality of operating environments to the source configuration data of the source operating environment, and
  generate additional update data including a set of software component versions of the second set of configuration data to update in the second target operating environment; and
propagate the unified release to the first target operating environment, wherein the release propagation data of the unified release is configured to provide instructions for the first target operating environment to update the target configuration data and deploy the new application service, wherein the first target operating environment is one of the plurality of operating environments in a release propagation path that differ from at least one of the other of the plurality of operating environments, wherein the unified release includes abstracted configuration data for each of the plurality of operating environments in the release propagation path.

\* \* \* \* \*